Dec. 20, 1938.  D. E. NORTHROP ET AL  2,140,543
METHOD OF REFINING ORGANIC ACID ESTERS OF CELLULOSE
Filed Dec. 7, 1935
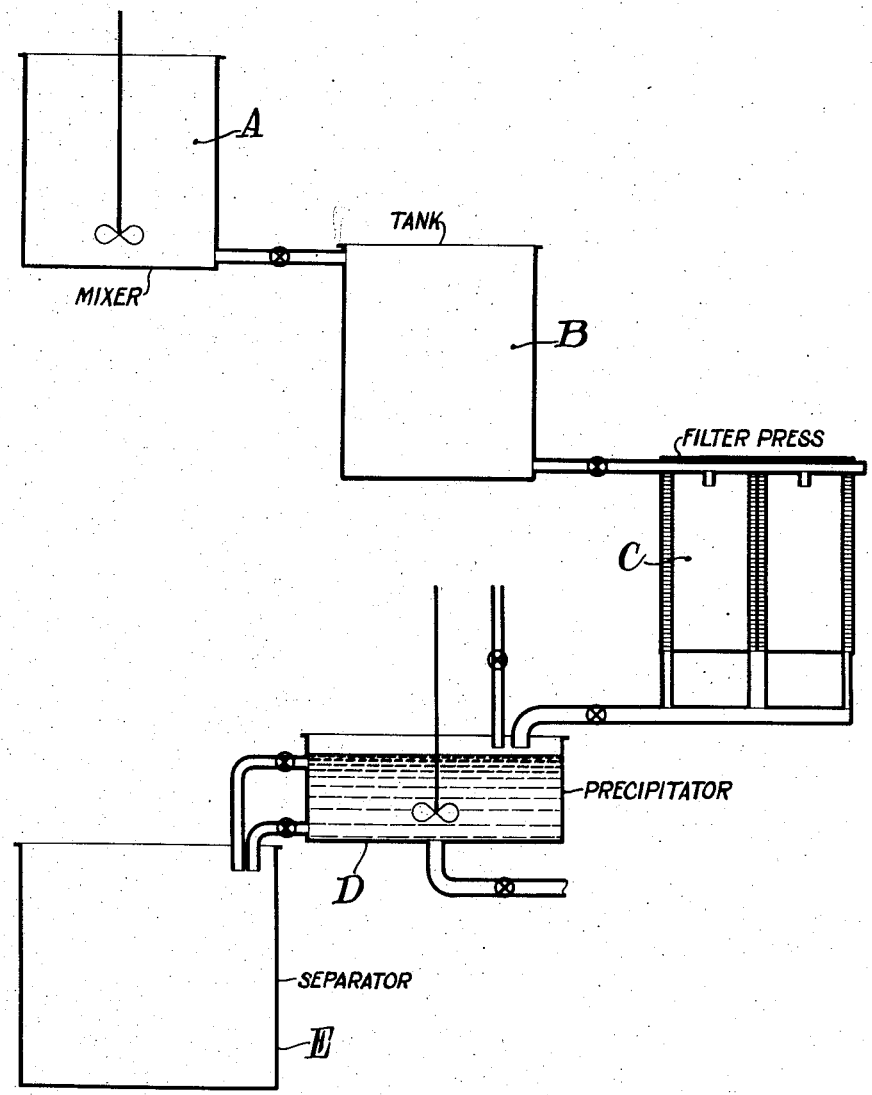
Dennis E. Northrop & Robert C. Burton,
INVENTORS:
BY Newton M. Perrins
Daniel J. Mayne
ATTORNEYS.

Patented Dec. 20, 1938

2,140,543

UNITED STATES PATENT OFFICE 2,140,543

METHOD OF REFINING ORGANIC ACID ESTERS OF CELLULOSE

Dennis E. Northrop and Robert C. Burton, Kingsport, Tenn., assignors, by mesne assignments to Eastman Kodak Company, Jersey City, N. J., a corporation of New Jersey Application December 7, 1935, Serial No. 53,391

11 Claims. (Cl. 260—102)

The present invention relates to the refining of organic acid esters of cellulose and the manufacture of high-grade, non-hazing, organic acid esters of cellulose. This application is a continuation-in-part of our application, Serial Number 669,546 now Patent Number 2,024,246 of Dec. 17, 1935.

As set forth in our copending application, in some instances in which cellulose esters are employed such as in laminated glass, photographic film, etc., it becomes important that the ester be of very high quality, free from haze and dust particles, and capable of withstanding heat and intense light, and other severe conditions which may be met with in use. For instance, if the cellulose ester is employed in safety glass, it should be capable of withstanding intense sunlight. If the cellulose ester is employed for moving picture film, it must be capable of withstanding intense artificial light. Presence of haze and discoloration in much of the safety glass now employed, is common knowledge, and is one drawback against a more universal adoption of safety glass. It is, therefore, apparent that many ordinary cellulose esters prepared in conventional ways yield cellulose esters unsatisfactory for the aforementioned uses.

One object of our invention is to provide a method for refining and manufacturing cellulose esters, and in particular cellulose acetate, whereby products of excellent clarity, freedom from haze and dust particles, and capable of withstanding the effects of elevated temperatures and severe light intensities, may be obtained. Another object is to prepare the cellulose ester in a granular form, so that solutions thereof may be readily prepared. Or in fact, it may be readily susceptible to any other treatment which it is desired to administer thereto. A further object is to provide a process in which the particle size of the final highly purified cellulose ester, and in particular cellulose acetate, may be regulated, and in which a product of uniform size may be obtained.

A still further object is to provide a process for manufacturing highly refined, non-hazing cellulose esters by a novel method which is capable of employing existing equipment and piping of the type now usually employed for the manufacture of ordinary cellulose esters. A still further object is to provide a refining process for manufacturing high-grade cellulose esters requiring simple and inexpensive control, yet capable of duplication of particle size and the production of a constant product. Another object is to provide a process for refining cellulose esters wherein the solvents employed may be readily removed from the refined ester. Other objects will appear hereinafter.

We have found that a high-grade, non-hazing cellulose ester of uniform particle size may be obtained by the procedure set forth herein, which includes obtaining or preparing the cellulose ester, redissolving the ester as set forth in detail herein, filtering, re-precipitating under the carefully controlled conditions stated and recovering the ester produced. The ester, resulting from our novel refining treatment is of improved quality and is resistant to the action of elevated temperatures, light rays and other agencies which adversely affect the clarity and increase the haze of sheets of ordinary commercial cellulose esters heretofore employed. Our product has proven to be acceptable commercially, and capable of withstanding the conditions of light and heat generally encountered in commercial use.

Our refining process may be applied to a previously prepared cellulose ester or to cellulose esters from various sources and will convert such esters into esters having improved qualities. Our process may be included in or added to processes for making cellulose esters. In carrying out our process to obtain exceptionally high grade esters it is desirable that the cellulose ester have been properly and carefully produced in that all detrimental constituents eliminated or removed in the production lightens the refining part of the process.

An example of a method for producing a cellulose ester is as follows: A good grade of cellulose, for example, in the form of cotton linters or wood pulp, may be subjected to a pretreatment with an aliphatic acid such as acetic acid, in the case of cellulose acetate manufacture. This pretreatment may consume from one to six hours at temperatures from 60 to 200° F. Such a pretreatment may be omitted, but it is preferred, since it facilitates esterification, which in the instance under consideration would be acetylation, and is accomplished by adding acetic anhydride, and aliphatic acid to the pretreated cellulose. An acetylation catalyst, such as sulfuric acid or zinc chloride, may be present and the acetylation carried out for a period of two to eight hours, depending on specific conditions, with temperatures varying between 60 and 150°.

After the acetylation treatment, the mixture may be subjected to hydrolysis or ripening, for a period which may vary from around 20 to 90 hours. This hydrolysis or ripening is accomplished by adding to the mixture dilute aliphatic acid, and in the example under consideration, dilute acetic acid. Also, a catalyst such as sulfuric acid may be included. The mixture is maintained at a temperature sufficient to cause ripening for a sufficient length of time, to produce a cellulose acetate with a desired acetyl content. After the ripening treatment, the ester is precipitated by pouring the dope into water, dilute acetic acid or other precipitant as for example in the manner described in U. S. Patents 1,560,554 to Farrow or 1,884,717 to Sheppard. The precipitated product is washed from 15 to 40 times with clean (preferably filtered) water, and preferably one or more times with distilled water, in order to remove the bulk of the acid. This procedure may be varied somewhat, and the cellulose ester washed in warm distilled water and rinsed and filtered in distilled water, the object being to fully and thoroughly wash the cellulose ester, thereby avoiding carrying into the subsequent refining steps detrimental components.

The water-wet cellulose acetate may then be dried to some extent by centrifuging. If the cellulose acetate is to be subsequently redissolved in an acetone-water solvent, the degree of drying the cellulose acetate may be more limited than in the instance where it is desired to re-dissolve the cellulose acetate in chemically pure acetone or acetone-menthanol. Therefore, if desired the centrifuged cellulose ester may be fully dried before redissolving it.

As the description proceeds, the reason for using any particular one of the several solvents mentioned will be apparent. This is an important feature of the present process, and the proper choice and use of a solvent in this part of the process assists in the elimination of some of the constituents which otherwise might impart undesirable characteristics to the refined ester.

The cellulose acetate is dissolved in the example under consideration, in any one of the solvents, C. P. acetone, acetone-water, acetone-menthanol. The resulting solution is then run through one or more filtering sheets or membranes, preferably under pressure. The filtered solution is then treated in accordance with one of the several ways described herein, to precipitate the ester from solution. Precipitation is so regulated in all instances as to employ a precipitating bath of a definite and preferably constant concentration, thus assuring a uniform particle size of the precipitation. The precipitating procedure also constitutes important features of the present application inasmuch as we have discovered novel and simple procedure for obtaining and duplicating the uniform particle size of the precipitate.

We prefer to employ a cellulose ester prepared in accordance with the several steps set forth because it produces an initial cellulose ester of the highest quality obtainable which, when subjected to the several refining steps described produces an excellent, non-hazing cellulose ester. It is, however, possible to employ cellulose esters from other sources and made by other processes and these esters after refining by our process will possess improved qualities.

The accompanying drawing diagrammatically illustrates an apparatus combination which may be employed for carrying out the refining steps in accordance with our invention. In accordance with one embodiment precipitated ester, which has been subjected to the several washing treatments as already described, is transferred to a drying unit which includes a centrifuge and if desired a heating dryer. From here the cellulose ester may be removed and dissolved in a suitable solvent of the type described in the mixer A. Or a cellulose ester from some other source may be placed in mixer A and dissolved. The contents of mixer A may be run by gravity or pumped into a storage tank B, from which it is forced into a filter press C, either by the weight of the solution in the tank B or by means of a pump. The solution may be refiltered by including a second filter press in the combination, it being understood, however, that our invention is not limited in this respect. The filtered solution is then led into the precipitating unit diagrammatically indicated at D. This precipitating unit may be of the type operated and described in our copending application S. N. 669,646, now Patent 2,024,246 of Dec. 17, 1935, or it may be of the structure described in the aforementioned Patents 1,560,554 and 1,884,417. After completing the precipitation, the mass in the precipitation unit may be diluted with water to around 20-25% concentration to prevent subsequent coagulation. The resulting mass containing the cellulose ester in suspension is then led into a unit designated E where the liquid and solid particles are separated.

The following specific example is set forth to illustrate our process of preparing a high grade cellulose acetate. These examples are set forth merely for the purposes of illustration.

About 4,500 lbs. of the cellulose acetate prepared as indicated above and containing about 2% of moisture, 38-40% acetyl and characterized by a 65-70 seconds 4:1 acetone viscosity was dissolved in about 25,500 lbs. of a solvent which was comprised principally of about 6,630 lbs. of distilled water and 18,870 lbs. of acetone. This solution may be accomplished in a stainless steel or nickel-clad steel type mixer, equipped with a suitable agitator.

The resulting solution was filtered first through a plate and frame press dressed with several layers of 8-10 ounce filter flannel and then to a second filtration through a similar press dressed with several layers of filter cloth and several layers of filter paper.

A predetermined, definite quantity of about 2100 lbs. of the resulting filtered dope was measured into a large deep stainless steel tank equipped with an agitator, operating at around 120 to 130 R. P. M. In the present instance, the predetermined quantity of about 1,160 lbs. of distilled water, cooled to about 20-25 C., was run into the agitated dope at the rate of about 70-90 lbs. per minute. This resulted in a concentration of approximately 50% acetone, by weight, and was the desired concentration under the conditions stated, to produce a precipitate of uniform particle size. The precipitated acetate was allowed to agitate for a few minutes after the water had been added. The temperature during this precipitation was maintained at around 20° C.-25° C. However, the temperature may be varied somewhat, say from 10° C.-40° C. according to the desired particle size of the precipitate. The lower the temperature the more readily the acetate will precipitate and the lower the temperature the smaller will be the particle size, other things being equal. After precipitation has been completed, sufficient water was added to reduce the acetone concentration to about 20-25%. The cellulose acetate then may be allowed to settle or may be dropped through a bottom discharged to a centrifuge still or other device wherein the acetate may be recovered, washed with distilled water and finally dried.

One particularly effective way of recovering the high grade, non-hazing organic ester in an acetone-free condition involves the settling of the ester after precipitation either in the precipitating unit or another tank. The supernatant precipitation solution is decanted from the settled precipitate. Fresh water is then added and the remainder of the acetone distilled off.

Precipitation by bringing together predetermined quantities as described in the above example has a number of advantages. Existing equipment, piping and the like, used in preparing ordinary cellulose esters, may be used without change. Simpler and less expensive control is available since expensive metering devices are not required. Precipitating conditions can be exactly duplicated because a definite amount of filtered ester and precipitant are used. The composite particle size range can be more accurately duplicated because the variable factors such as amount of material in the precipitation, ratio of precipitant to solids, changes in concentration of precipitant, and similar factors may be controlled or eliminated. In addition, the control of particle size would be automatically a function of standard precipitating conditions and would, therefore, be more uniform than when controlled at the discretion of an operator.

Instead of adding a definite amount of water or other precipitant to a definite amount of filtered cellulose ester, a definite quantity of filtered cellulose ester may be added to a definite amount of the precipitant. That is, by adding the filtered cellulose ester to the precipitant, a distinct advantage is available. By such technique the ester is originally precipitated from a solution under the influence of the maximum concentration of the precipitant. Throughout the precipitation the solvent power of the precipitant never exceeds the solubility points of the ester, it being clear from the disclosure herein that the predetermined quantity of cellulose ester is such that the addition of cellulose ester would be short of that point. Consequently this procedure yields a precipitate having a more open and fluffy character and which lends itself more readily to washing, ultimate solution and other treatment.

While in the above example we have described the use of a precipitant comprising approximately 50% acetone by weight, the concentration of the precipitant may be varied considerably, either with respect to a water-acetone precipitant or other precipitant such as the acetone-methanol precipitant described in the next example. For example with respect to a water-acetone precipitant, the water concentration may range from 45%–50% (depending on the particular ester) and obtain a fine granular product. With the water concentration at about 65% the resulting precipitate will comprise large fibrous particles. In order to obtain the finest particle size, the concentration of the aqueous acetone employed should be that which just precipitates the cellulose ester from its solution.

The concentration of the precipitant may differ according to the particular characteristics of the ester being treated. For instance, cellulose acetate having an acetyl content of about 40% will precipitate in an aqueous acetone having a lower water content than a cellulose acetate having an acetyl content of 37%. The susceptibility of cellulose ester to precipitation is considered fully in U. S. Patent 1,878,953 of C. J. Malm.

In the above example, we have described dissolving the cellulose ester, prior to filtration, in an acetone-water solvent. The concentration of this acetone-water solvent may vary considerably as already indicated and outside of the values shown, and may range from about 50% up to as much as 95% acetone.

In the selection of a suitable concentration of the aqueous acetone it is well to keep in mind that if the viscosity of the solution is kept low this will facilitate the passage of the solution through the filter. The further the cellulose ester has been hydrolized, the higher may be the water content of the aqueous acetone which may be employed as a solvent and which will give a solution having the minimum viscosity.

The procedure in the above example, or the procedure in our co-pending application, Serial No. 669,546, now Patent No. 2,024,246 of Dec. 17, 1935, may be rendered more effective in most instances by the use of the particular solvents to be described in detail in the redissolving steps carried out in mixer A. By the choice of the proper solvent the filtration and other subsequent steps may become more effective.

The use of C. P. substantially pure acetone in place of acetone and water as a solvent for dissolving the cellulose ester to be purified presents some distinct advantages. For example, in cellulose acetate there may be a portion which is more soluble in acetone-water than in pure C. P. acetone. This portion may include a component such as over-hydrolized material, which might cause haze in the final product, if permitted to be taken up therein. If the acetate to be purified is dissolved in pure acetone, some of these haze-causing substances, being insoluble, will be removed during filtration, and consequently will permit a more clear ultimate product to be obtained.

The use of acetone-methanol as a solvent in our process for the production of the high-grade, non-hazing cellulose ester may also present a number of distinct advantages. A more pure product can be obtained by virtue of the fact that certain materials such as waxes, resins, and condensation products of sulfuric acid with cellulose, anhydride and other materials present during the acetylation are soluble in organic solvent mixtures such as acetone-methanol, whereas they are insoluble in acetone-water mixtures for example. Consequently, by the use of an acetone-methanol solvent for dissolving a cellulose ester containing these impurities, these undesirable impurities are put into a form whereby they can be washed out during the refining process.

The following example will serve to illustrate the use of acetone-methanol in our process: About 4,500 lbs. of a good grade cellulose acetate was dissolved with about 19,000 lbs. of a 50–50 mixture of acetone and methanol. The resulting dope was filtered twice and delivered to the precipitator at room temperature.

The precipitator was filled about one-third full with a solution comprised of 3 parts methanol and 1 part acetone. The agitator was started and dope and methanol pumped in at the rate of 90 lbs. and approximately 73 lbs. per minute respectively. The methanol was cooled to 20–25° C., before use. The resulting precipitant was at all times approximately 3 parts methanol and 1 part acetone but may be varied as previously indicated depending on temperature and the particle size desired. The precipitator was allowed to become half full when the discharge valve was opened sufficiently to maintain the level at the half mark.

From this point on, the process was carried out substantially identical with the above acetone-water process and the washing treatment, in removing any remaining acetone-methanol, also removes the undesirable impurities contained therein.

An example of a process using C. P. acetone as a solvent is now given: The equipment required for this process is substantially the same as that specified for the previous example. About 4,500 lbs. of 2% $H_2O$, 38.5–39% acetyl, 65–70 seconds 4:1 acetone viscosity cellulose acetate was dissolved in 19,000 lbs. of C. P. acetone. The acetone solution was filtered one or more times and the acetate precipitated therefrom by running dope and 20°–25° C. distilled water simultaneously into the precipitator at the rate of about 90 lbs. of dope and approximately 73 lbs. of water per minute. This produces a precipitant of substantially constant concentration at all times during the precipitation period. The amount of water may vary somewhat depending on the temperature. From this point on, the process is similar to the above described process and the precipitated ester is recovered, washed and dried.

It may be seen from the several examples above that our process may be varied to some extent. While we have described the use of three parts of methanol to one part of acetone, these proportions may be varied, dependent on the particular ester under treatment, the temperature, the particle size desired, to from about one part of methanol to three parts of acetone both as to the solvent and the precipitant. While we have described our process as applied to quantities of cellulose esters amounting to several thousand pounds, our process may be applied to smaller or larger quantities, it being understood that a corresponding change be made in the proportion of solvent, precipitant and the like. Other changes may be instituted without departing from the spirit of our invention.

As has been pointed out herein, various organic acid esters of cellulose, other than cellulose acetate, such as cellulose acetate propionate, cellulose acetate butyrate, cellulose acetate propionate butyrate and the like may be prepared by processes as carried out in accordance with our invention.

The product prepared according to our invention, due to its fine particle size, may be employed especially in situations where a cellulose ester which is more readily susceptible to action of various agents, such as solvents, is desired. For instance, a cellulose acetate resulting from our invention will dissolve more quickly in an organic solvent in which it is soluble than an untreated cellulose acetate of the same kind. Also, due to its clarity and freedom from impurities and haze, cellulose esters refined by our invention are especially suited for use in products in which transparency is of importance, such as in laminated glass or photographic film. These refined esters especially those of particularly fine particle size, such as 40 mesh or finer, may be employed in the manufacture of molding powders which when subjected to heat and pressure form molded products of good quality.

What we claim and desire to secure by Letters Patent of the United States is:

1. A process for the manufacture of high-grade, non-hazing, acetyl esters of cellulose which comprises preparing and precipitating an organic acid ester of cellulose, subjecting the precipitated ester to washing, at least partially drying the ester, dissolving the ester in a solvent, filtering the solution thus formed and then precipitating the ester from its solution by means of an agitated precipitant which at least just precipitates the ester but comprises less than 65% water, and maintaining this precipitant of substantially uniform and constant composition during precipitation by rapidly comingling the precipitant and filtered ester.

2. In a process for the production of high-grade, organic acid esters of cellulose in granular form of 12 mesh or finer, the steps which comprise dissolving a partially hydrolyzed organic acid ester of cellulose in chemically pure acetone filtering the solution thus obtained, isolating a predetermined quantity of the filtered solution, preparing a precipitating bath containing a predetermined batch of water directly proportional to the quantity of filtered solution isolated and including sufficient water to precipitate the ester but less than 65%, adding the predetermined quantity of filtered solution isolated to the precipitating bath, and subjecting the mixture to agitation to produce a substantially constant concentration bath during precipitation.

3. In a process for the production of high-grade organic acid esters of cellulose in the form of small particles of substantially uniform size, the steps which comprise dissolving an acetone-soluble acetic acid ester of cellulose in an acetone-methanol solvent, filtering the solution thus formed, and then substantially completely precipitating the ester from its solution by means of an agitated precipitant of a predetermined and approximately constant concentration substantially at all times during precipitation to produce a high-grade ester of uniform particle size.

4. In a process for the production of high-grade, organic acid esters of cellulose, the steps which comprise dissolving an organic acid ester of cellulose in an acetone-methanol solvent, subjecting the solution formed to at least one filtration treatment, isolating a predetermined batch of the filtered solution and contacting it with a predetermined quantity of water sufficient to cause precipitation of the ester from the filtered solution but insufficient to produce a precipitation bath having more than 60% water, and subjecting the mixture to agitation to obtain a precipitating bath of uniform and constant concentration substantially at all times during said precipitation.

5. In a process for the production of high-grade, substantially acetone free organic esters of cellulose, the steps which comprise dissolving an organic acid ester of cellulose which has been partially hydrolyzed in an acetone-containing solvent, filtering the solution thus formed, substantially completely precipitating the ester from its solution in an agitated precipitant containing not more than 65% water maintained at approximately constant concentration over substantially the entire precipitation period, and then permitting the precipitated cellulose ester to settle, decanting the supernatant liquid from settled cellulose ester, and then adding water to the settled cellulose ester and subjecting the mixture to a distillation treatment to remove acetone.

6. In a process for the production of a high-grade, cellulose acetate, the steps which comprise dissolving a partially hydrolyzed cellulose acetate in a solvent comprising about 40%–60% acetone, the balance principally methanol, subjecting the solution formed to at least one filtration treatment, isolating a predetermined quantity of the filtered solution and contacting it with a predetermined quantity of a precipitant comprised of about 15% to 30% of acetone, the balance principally methanol, and subjecting the mixture to agitation to produce a precipitant of a substantially uniform and constant concentration during precipitation.

7. In a process for the production of a high-grade cellulose acetate, the steps which comprise dissolving a partially hydrolyzed cellulose acetate in a solvent containing acetone, filtering the solution thus formed, isolating a predetermined quantity of the filtered solution, adding a predetermined quantity of water at a temperature below 40° C. sufficient to cause precipitation of the cellulose acetate and form a bath of approximately 45% to 50% concentration of acetone by weight, and subjecting the mixture to agitation to produce a precipitant of a substantially uniform and constant concentration during precipitation.

8. In a process for the production of high-grade organic esters of cellulose in a granular form finer than 12 mesh, the step which comprises dissolving an acetone-soluble acetyl ester of cellulose in a solvent, subjecting the solution formed to at least one filtration treatment, isolating a quantity of the filtered solution and precipitating the ester therefrom by means of an aqueous acetone precipitating agent maintained at a temperature between about 20° C. and 25° C., the concentration of the aqueous acetone employed being that which just precipitates the ester from the filtered solution.

9. In a process for the production of acetic acid esters of cellulose in the form of finely divided particles and substantially acetone-free, the steps which comprise dissolving acetic acid ester of cellulose which has been at least partially hydrolyzed to acetone-solubility, in an acetone-containing solvent, filtering the solution thus formed, reprecipitating ester from its filtered solution by means of a precipitant maintained under conditions of temperature, composition and agitation to produce said finely divided particles, separating supernatant liquid from the precipitated particles, adding water to the particles and subjecting the mixture of ester particles and water to a distillation treatment for removing acetone therefrom.

10. In a process for the production of high-grade organic acid esters of cellulose in a granular form of 8 mesh or finer, the steps which comprise dissolving a partially hydrolyzed organic acid ester of cellulose in a solvent, subjecting the solution formed to at least one filtration treatment, isolating a measured batch of the filtered solution and contacting this measured batch with a measured quantity of aqueous liquid, at a temperature below 40° C., directly proportional to the batch of filtered solution isolated in that said aqueous liquid is sufficient when vigorously agitated with the filtered solution to cause precipitation of the ester therefrom and to produce a precipitant having less than 65% water and of a substantially uniform and constant concentration substantially at all times during precipitation.

11. In a process for the production of high-grade organic acid esters of cellulose in the form of small particles, the steps which comprise dissolving an acetone-soluble organic acid ester of cellulose in an acetone-containing solvent, filtering the solution thus obtained, isolating a quantity of the filtered solution, preparing a precipitating bath containing a measured batch of precipitant at a temperature less than 40° C., of a quantity and composition with respect to said filtered solution when agitated therewith, to cause the precipitation therefrom of said small particles of ester, in a bath having a water concentration at least sufficient to cause precipitation but not greater than 60%, adding said filtered solution to the precipitating bath, and subjecting the mixture to vigorous agitation for obtaining and maintaining the precipitating bath at an approximately constant concentration.

DENNIS E. NORTHROP.
ROBERT C. BURTON.